May 8, 1951 C. M. ROSE 2,552,016
CONVERTIBLE HAND RAKE
Filed July 15, 1946 6 Sheets-Sheet 1
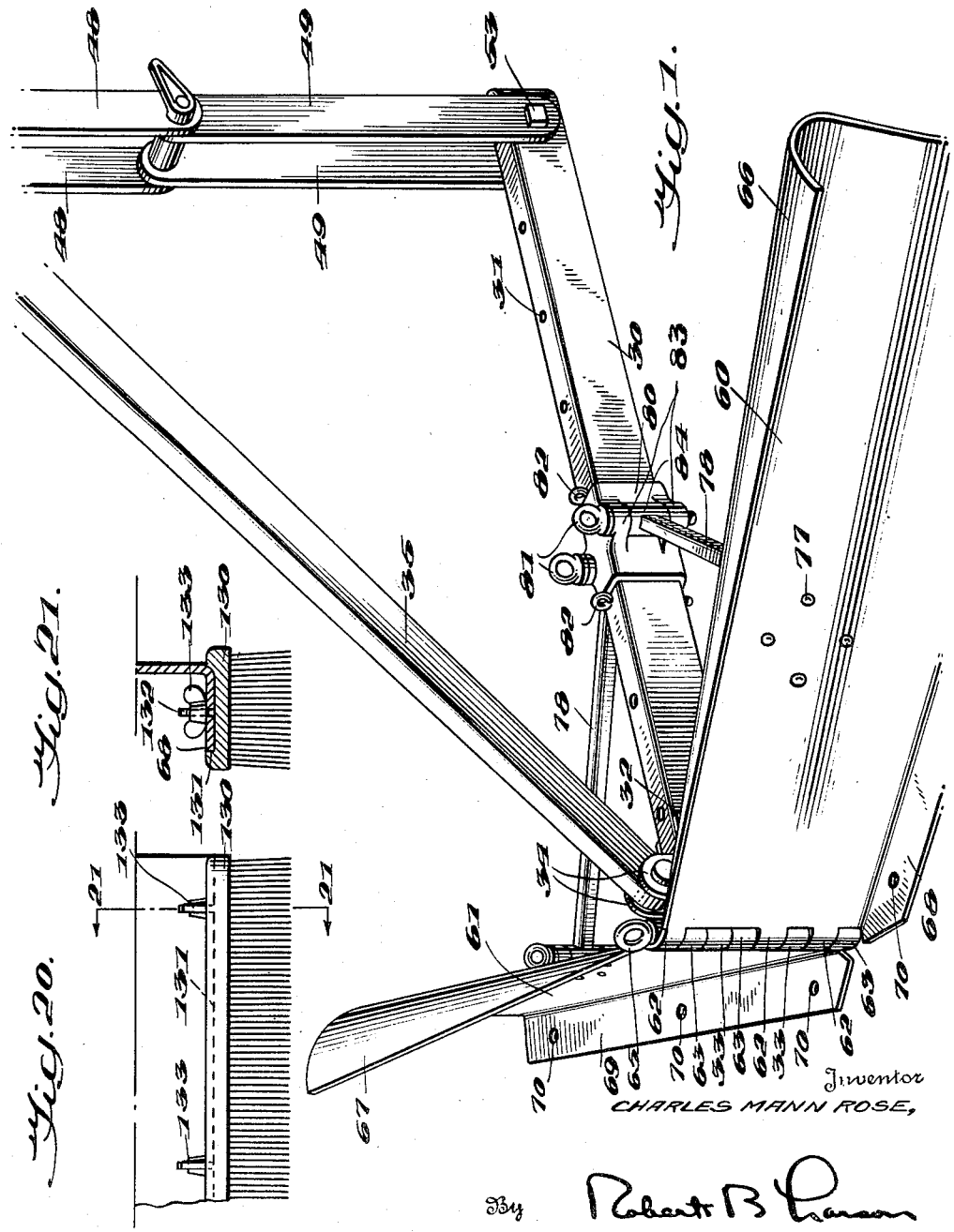
Inventor
CHARLES MANN ROSE,
By Robert B. Larson
Attorney

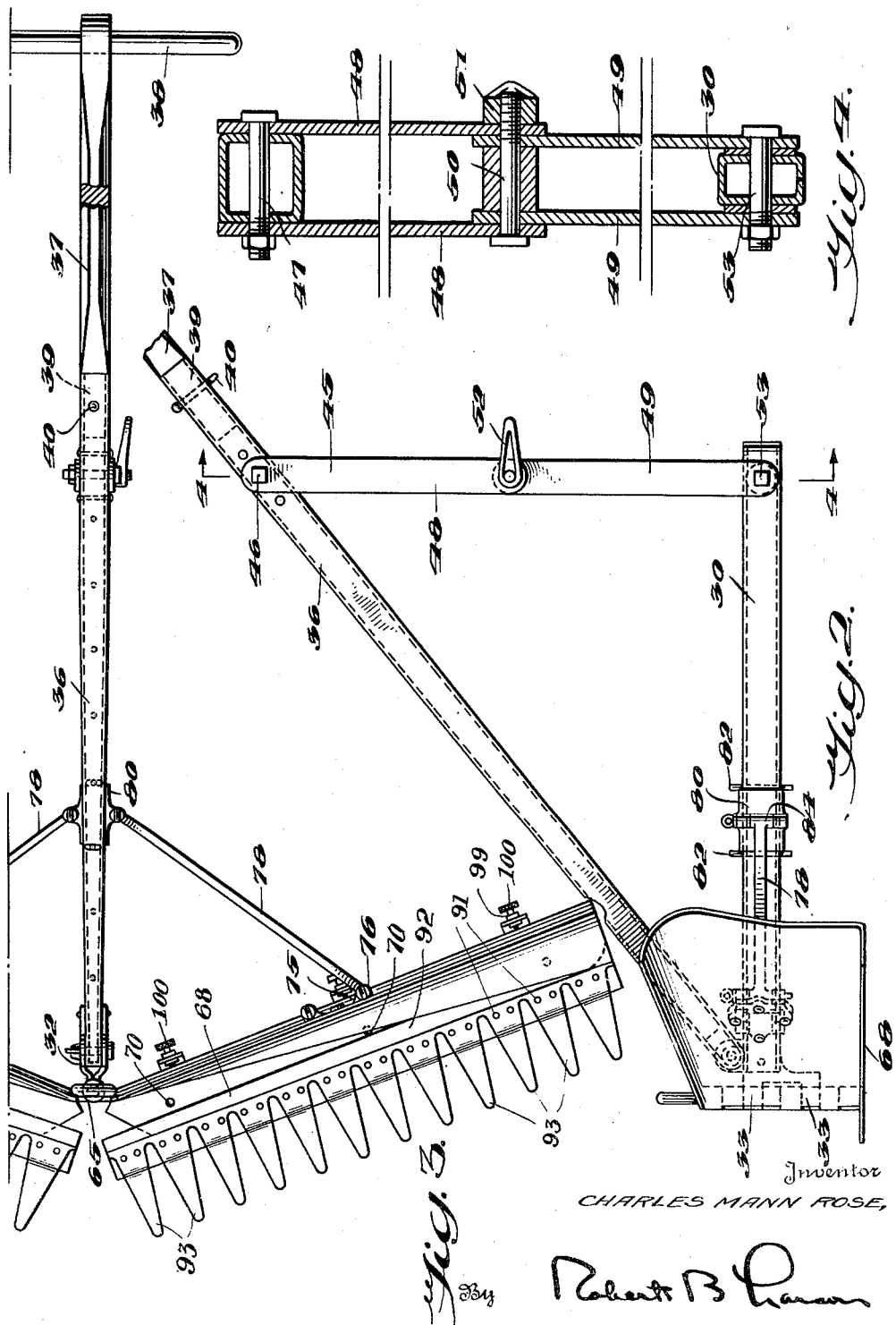

May 8, 1951
C. M. ROSE
2,552,016
CONVERTIBLE HAND RAKE
Filed July 15, 1946
6 Sheets-Sheet 3
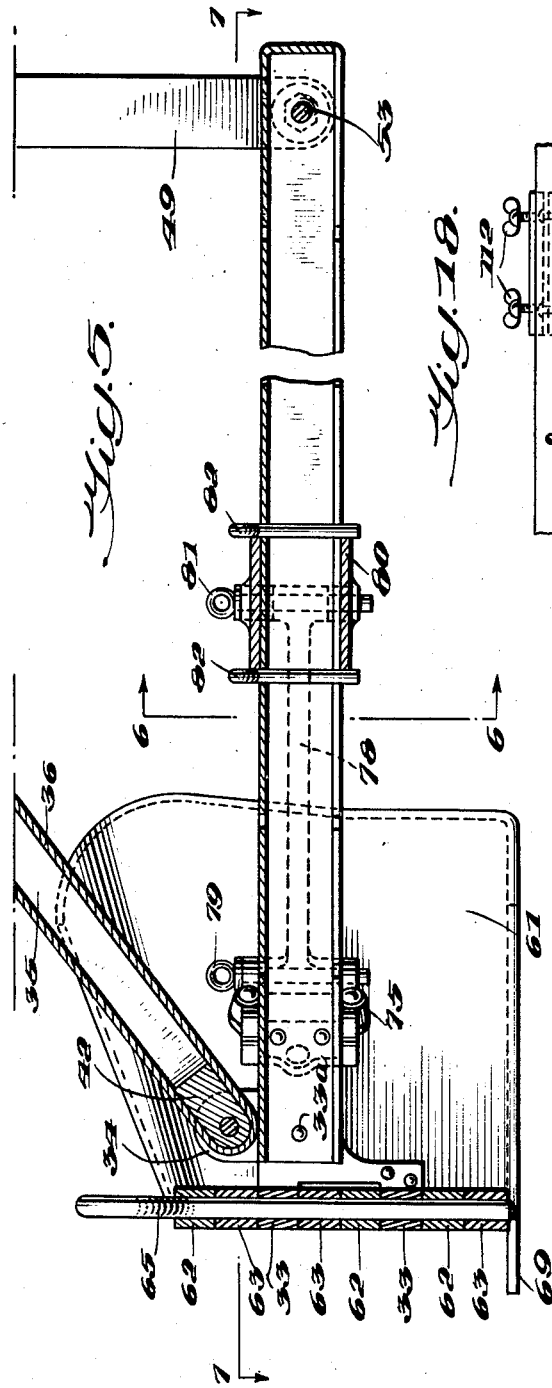
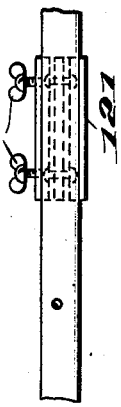
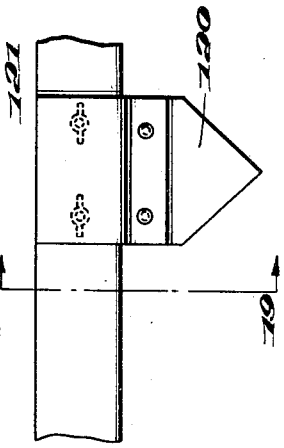
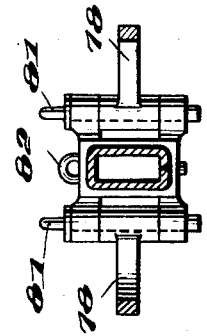
Inventor
CHARLES MANN ROSE,
By Robert B. Larson
Attorney May 8, 1951 C. M. ROSE 2,552,016
CONVERTIBLE HAND RAKE
Filed July 15, 1946 6 Sheets-Sheet 4
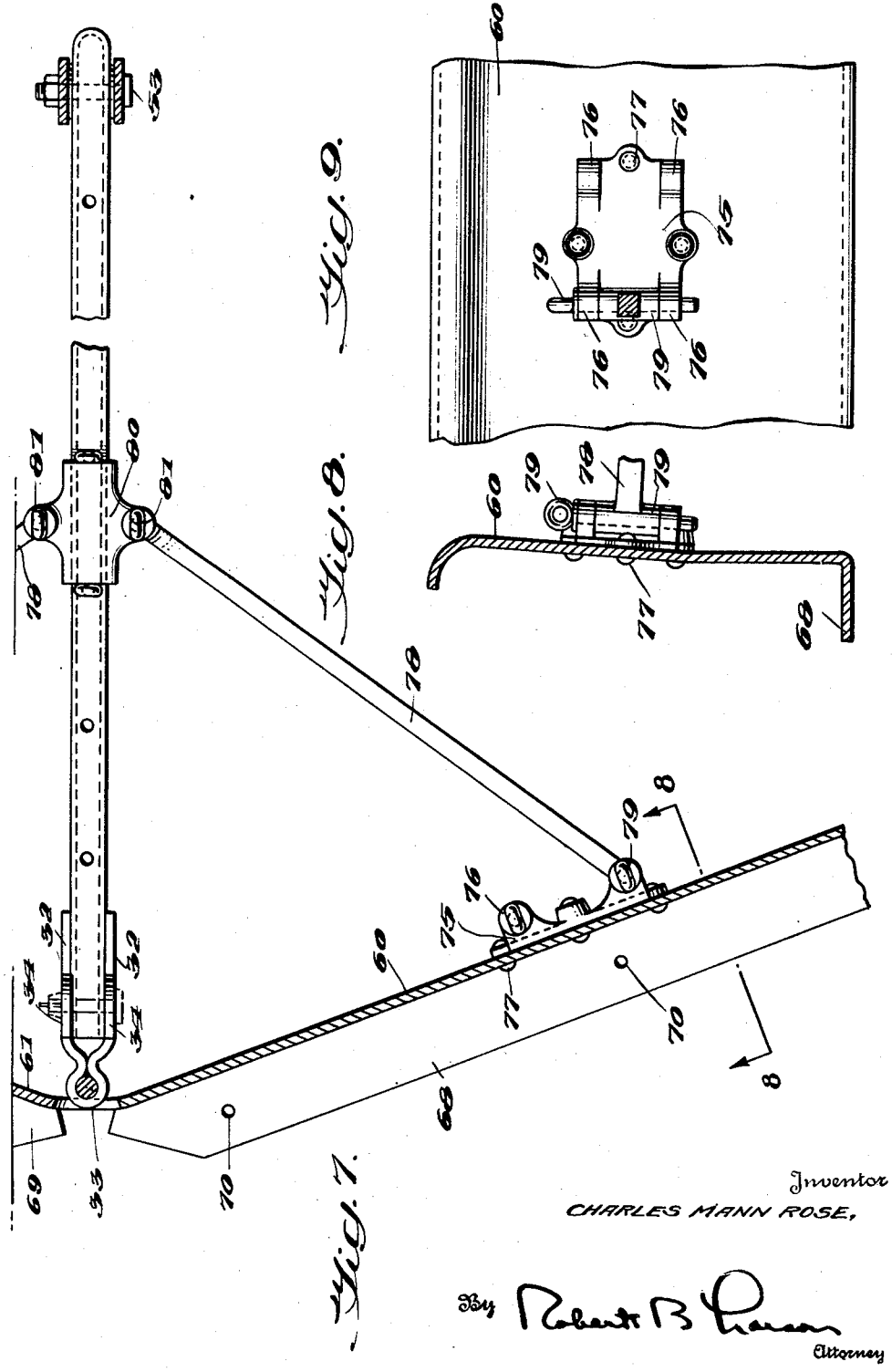
Inventor
CHARLES MANN ROSE,
By Robert B. Pearson
Attorney May 8, 1951  C. M. ROSE  2,552,016
CONVERTIBLE HAND RAKE
Filed July 15, 1946  6 Sheets-Sheet 5
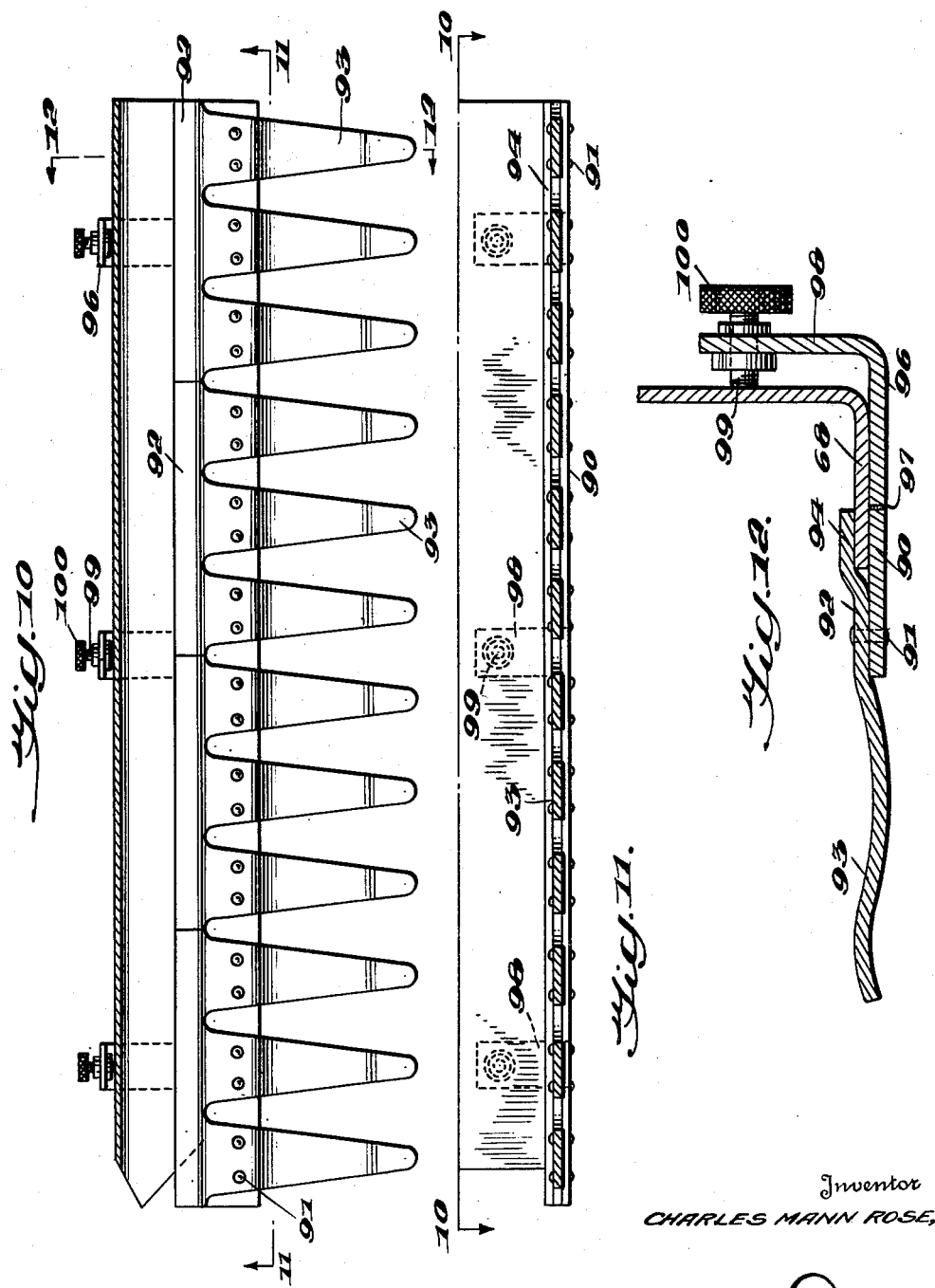
Inventor
CHARLES MANN ROSE,
By Robert B. Pearson
Attorney

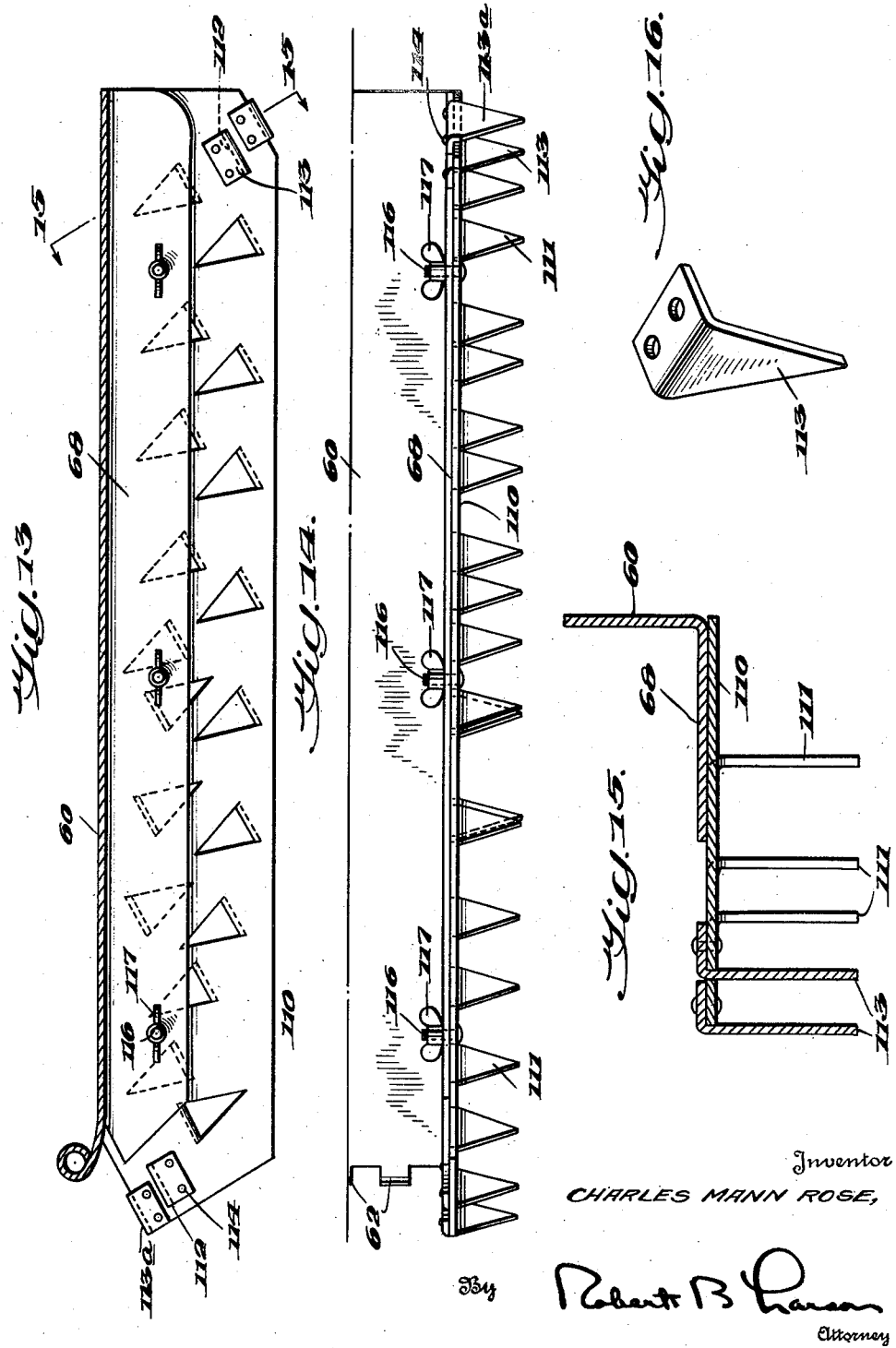

Patented May 8, 1951

2,552,016

UNITED STATES PATENT OFFICE 2,552,016

CONVERTIBLE HAND RAKE

Charles Mann Rose, Westfield, N. J.

Application July 15, 1946, Serial No. 683,693

2 Claims. (Cl. 56—400.04)

This invention relates to a convertible implement comprising a snow pusher or plow which is adaptable to three additional uses, namely as a harrow, a rake, and a brush.

The implement comprising this invention is known as the "Convertible Hand Rake" because of its adaptability for use the year around. In the winter the basic snow plow is useful for removing snow from walks, driveways, etc.; in the spring, conversion to a harrow makes the implement useful for gardening; in the summer, conversion to a rake is convenient for raking grass; and in the autumn, the rake serves for removing leaves. The brush attachment of course is useful the year around.

By means of this novel implement, the average house owner with his limited means and small amount of available storage space is able to own a combination device which is useful for a number of purposes throughout the year, rather than having to purchase a multitude of implements, each having a single utility, with the attendant expense and storage problem.

A primary object of the invention is to provide a convertible implement having a variety of uses throughout all seasons of the year.

Another object of the invention is to provide a snow plow having means for converting the device by use of a variety of ground engaging attachments such as harrow, rake, and brush attachments.

Another object of the invention is to provide a novel rake by conversion of the implement.

Another object of the invention is to provide a snow plow having novel structure facilitating the attachment and use of a number of parts which make the device useful the year around.

A further object of the invention is to provide a snow plow having a novel structural arrangement of parts.

Another object of the invention is to provide an implement of the type referred to above which is simple and cheap to manufacture and may be assembled, disassembled and the parts interchanged by persons having a minimum of mechanical aptitude.

These and other objects of the invention will be apparent from the following specification and the accompanying drawings, in which:

Fig. 1 is an enlarged perspective view of the lower part of the basic assembly;

Fig. 2 is a side elevational view of the assembly shown in Fig. 1;

Fig. 3 is a top plan view of the entire basic assembly;

Fig. 4 is an enlarged sectional view taken on line 4—4 of Fig. 2;

Fig. 5 is a longitudinal sectional view taken on the central longitudinal axis of the basic assembly and showing a portion of the device shown in Fig. 1;

Fig. 6 is a cross-sectional view taken on line 6—6 of Fig. 5;

Fig. 7 is a fragmentary cross-sectional view taken on line 7—7 of Fig. 5;

Fig. 8 is a cross-sectional view taken on line 8—8 of Fig. 7;

Fig. 9 is a rear elevational view of the side hinge block positioned on the rear side of the wing member shown in Fig. 7;

Fig. 10 is a sectional view looking downwardly of a portion of the left wing member showing the rake attachment in place;

Fig. 11 is a cross-sectional view taken on line 11—11 of Fig. 10;

Fig. 12 is an enlarged cross-sectional view taken on line 12—12 of Fig. 10;

Fig. 13 is a view similar to Fig. 10 but showing a harrow attachment in place on a wing member;

Fig. 14 is a front elevational view of the structure shown in Fig. 15;

Fig. 15 is an enlarged sectional view taken on line 15—15 of Fig. 13;

Fig. 16 is an enlarged detail elevational view of one of the end harrow points;

Fig. 17 is a front elevational view of a harrow point attached to the main beam;

Fig. 18 is a plan view of the structure shown in Fig. 17;

Fig. 19 is a cross-sectional view taken on line 19—19 of Fig. 17;

Fig. 20 is a fragmentary front elevational view of a portion of one of the wings showing the brush attachment in place; and Fig. 21 is a cross-sectional view taken on line 21—21 of Fig. 20.

The preferred form of the invention shown in the drawings includes a main longitudinal beam 30 which is preferably a metal tube rectangular in cross-section and provided with a plurality of spaced openings 31 extending through the beam. At the forward end of the beam a handle anchor member 32 of sheet metal is riveted to the beam. Anchor member 32 comprises a piece of sheet metal bent back upon itself so as to form two forwardly extending hinge portions 33 separated by a cut-out portion. The rear ends of the anchor 32 extend rearwardly along the front end of the main beam 30 and are attached to the beam 30 by rivets 33a. Upwardly extending ears 34 on each rear end portion of the anchor provide spaced pivot points for a handle 35.

Handle 35 comprises two portions, a lower tubular metal portion 36 of rectangular cross section tapering toward the lower end, and a wooden upper portion 37 having a transverse hand grip 38 at its upper end and a tenon portion 39 of diminished diameter at its lower end which fits snugly within the upper end of tubular metal portion 36 of the handle. A pin 40 passes through aligned openings in the metal handle portion 36 and wooden handle tenon portion 39 to maintain the parts of the handle in assembled relation.

At the lower end of metal handle portion 36, a wooden filler block 42 is inserted in the handle and the metal of the handle bent about the end of the block. Hinge pin 43 passes through the end of metal handle portion 36 and block 42 to fasten the handle to ears 34 of anchor member 32.

Near the upper end of metal handle portion 36, the upper end of a handle supporting bracket 45 is pivotally attached at 46 by a cross bolt 47. Bracket 45 comprises a pair of spaced upper members 48, and a pair of spaced lower members 49 pivoted to the upper members by a bolt 50 having a nut 51 and a handle 52 for tightening the bolt to lock the upper and lower bracket members in any selected angular relation for a purpose which will be explained presently. The lower ends of lower members 49 are pivotally attached to the rear end of main beam 30 by a pivot bolt 53.

On either side of main beam 30 are two transversely extending wing members 60 and 61 on the left and right sides, respectively, of the beam. These wing members are of sheet metal, and at their inner ends have extended portions which are bent to form hinges. The hinge portions of wing 60 are shown at 62 while the hinge portions of wing 61 are shown at 63 (Figs. 1 and 5). By aligning wing hinge portions 62, 63 and anchor hinge portions 33, a hinge pin 65 may be inserted from above to mount the wing members 60 and 61 pivotally on the forward end of beam 30.

The upper edges of wings 60 and 61 are bent forwardly at 66 and 67, the portions of the wings which are bent being increased toward the outer end of each wing as best shown in Fig. 1. Bent portions 66 and 67 prevent the snow or other loose material being pushed and collected by the implement from passing over the upper edges of the wings.

The lower edges of wings 60 and 61 are bent forwardly to form substantially horizontal flange or shoe portions 68 and 69, each of which has three spaced openings 70 which serve a purpose to be discussed presently.

Substantially centrally located on the rear surface of each wing member 60 and 61 is a hinge block 75 which has two sets of hinge lugs 76, the two sets being spaced transversely with relation to the longitudinal axis of the implement. Hinge blocks 76 are suitably attached to the respective wing members by any suitable means such as by rivets 77. The two transversely spaced sets of hinge lugs 76 permit interchangeability of hinge blocks 75 and also permit attachment of brace bars 78 (to be described presently) to either set, the angle of the wings being varied according to which set is chosen.

A brace bar 78 is hinged to each of the hinge blocks 75 by means of a removable pin 79 which passes through the hinge lugs 76 and through a tubular hinge member 79 carried by the end of each bar 78.

The other ends of brace bars 78 are pivotally attached to an adjusting slide 80 by means of removable pins 81. Adjusting slide 80 is a hollow box-like member which fits about main beam 30 and slides therealong. The length of slide 80 is approximately equal to the distance between adjacent holes 31 in the beam so that by means of removable pins 82 placed in holes 31 at either end of the slide, the slide may be fixed in any desired position along the main beam 30. Slide 80 has a pair of hinge lugs 83 on each side which cooperate with tubular hinge members 84 on the inner ends of brace bars 78 and hinge pins 81 to form a hinge pivotally attaching the inner ends of brace bars 78 to slide 80.

It will be apparent that the angular position of wings 60 and 61 relative to main beam 30 may be adjusted at will by moving slide 80 along beam 30. The utility of this adjustable feature will be explained presently.

The basic implement which has now been described is useful for collecting loose material such as snow. The adjustability of the angle of the wings permits use of the implement as a snow plow with snow of varying depths. For instance, in the case of snow of shallow depth, say ½ inch, the snow may be removed with the side members extended at an angle of approximately 60° to the main beam while deeper snow would require diminishing the angle depending upon the depth of the snow.

An important feature of the construction is the proportioning of the main beam 30 so that it is longer than the individual side members 60 and 61. This permits use of the rear end of beam 30 as a fulcrum about which the wings 60 and 61 may be lifted over small obstructions by merely pushing downwardly on the upper end of the handle. When this is done, the pressure is transmitted through handle support 45 and the forward end of the handle to the beam 30 to lift the forward end of the beam.

Another convenient feature is the adjustability of the angular relation of upper and lower portions 48 and 49 of bracket 45. By means of the tightening bolt 50, the height of handle 35 may be adjusted to suit the user.

In order to convert the implement for use as a novel type of rake, I have provided attachments as shown in Figs. 10–12. Each attachment, one of which is attached to each wing member 60 and 61, comprises a retainer plate 90 which is a long narrow metal plate approximately the length of a wing member. Secured to plate 90 along its length by means of rivets 91 or, if preferred, by spot welds are a series of tang or tine units 92 each having a plurality of forwardly extending tangs or tines 93 which gradually diminish in diameter toward their rounded forward ends. From the side the tangs are somewhat bowed with downwardly slanting end portions as shown in Fig. 12. The rear ends of units 92 are bent upwardly at 94 so as to be spaced from retainer plate 90 a distance approximately equal to the thickness of shoe portions 68 and 69. By making the plates 92 slightly resilient and by making the distance between plate 90 and portion 94 of plate 92 slightly less than the thickness of shoes 68, 69, a slight clamping action on the front edge of the shoe may be accomplished, if desired.

Three spaced clamp members 96 are welded at 97 to the rear edge of plate 90. Clamp members 96 are L-shaped and have their upwardly extending rear portions 98 spaced from the rear surface of wings 60, 61 when assembled to the wings, and provided with clamp screws 99 adapted to bear against the rear surfaces of the wings. Clamp screws 99 have knurled heads 100 so that they may be tightened and untightened by hand.

The rake attachments just described may be attached to the basic implement by sliding the attachments onto the wings from the outer end of each wing with clamp screws 99 loosened. When the rake attachments are in place as shown in Fig. 10, clamp screws 99 are tightened and the device is ready for use.

When using the rake attachments, the wings are best positioned at approximately right angles to beam 30. With the rake attachments in place, the implement comprises a novel type of rake having forwardly extending tangs rather than the conventional downwardly extending tangs. The horizontal tangs slide over the surface of the earth when the implement is pushed forwardly, and leaves, grass, or other matter to be removed are picked up by the tangs and collected on the shoes of the wings and against the forward surface of the wing portions from which the material may very conveniently be collected for disposal.

When it is desired to use the implement to prepare ground for seeding, to remove weeds or perform other similar functions, the basic implement may be quickly and simply converted into a harrow by use of the attachment shown in Figs. 13-19.

The harrow attachment comprises a plate 110 having a plurality of pointed downwardly extending harrow points 111 punched out of the plate 110. Near each end of plate 110 where there would be insufficient metal to punch out harrow points, a slot 112 is cut out of the plate and points 113 as shown in Fig. 16 are attached to the upper surface of plate 110 by rivets 114 so that the points 113 project downwardly through slots 112. Other points 113a identical with points 113 are riveted to the ends of plate 110 with their points projecting downwardly beyond the edge of plate 110.

Points 111 and 113 are positioned at an angle of approximately 30° with respect to the longitudinal edge of plate 110, and in order to position points 113a at the same angle, the edges of the plate on which points 113a are mounted are formed at approximately the same angle.

Plates 110 are fastened to the under sides of shoes 68, 69 by means of upwardly projecting bolts 116 carried by plates 110 so as to extend upwardly through holes 70 where they are held in place by means of wing nuts 117 positioned above the shoes.

If desired, a harrow point 120 may be positioned on the main beam 30. Point 120 is riveted to side arms 121 which slip over the beam from below and are held in place by wing screws 122. The use of the central harrow point 120 prevents there being a central gap in the coverage of the harrow.

The harrow attachments are easily mounted and demounted by means of wing nuts 117. When in use, each of the wings is positioned at an angle of 20 to 30 degrees with respect to beam 30 so that the harrow points are moved substantially sideways through the surface of the earth by pushing the implement forwardly. The large surface of plates 110 assists the device in riding easily along the surface of the earth, and the provision described above for raising the front end of the implement by pushing downwardly on the handle is useful in lifting the harrow over minor obstructions.

The basic implement may also be converted with ease to use as a brush by mounting brushes 130 (Figs. 20 and 21) on the under sides of shoes 68, 69. The brushes have longitudinal grooves 131 in their upper backing surfaces into which the shoes fit snugly. Bolts 132 carried by the brushes and wing nuts 133 provide convenient means for attaching the brushes to the shoes by means of holes 70 in the shoes. The brushes may be used for sweeping loose dirt on the earth's surface, floors, sidewalks, or any other surface.

The convertible implement which I have described may be easily assembled and disassembled and is useful the year around by use of the various attachments described. When disassembled, the implement may be stored in a comparatively small space. In use, the implement is light and easily handled. The novel rake which results from use of the rake attachment has considerable advantages in convenience and efficiency over old type pulled rakes.

It is to be understood that I have described only a preferred embodiment of the invention and I intend to cover all modifications of the invention falling within the scope of the appended claims.

I claim:

1. An implement for raking and the like comprising a substantially horizontal longitudinally extending beam, a handle member hinged to the forward end of the beam, a variable length brace member attaching the rear end of said beam to said handle at a position spaced from the forward end of said handle, a hinge member carried by the forward end of the beam, a pair of transverse vertical wing members pivotally mounted on said hinge member, said wing members having vertical material engaging surfaces of substantial frontal surface area and forwardly extending, substantially horizontal bottom flanges, a slide member movable along said beam, brace members connecting said slide member to each of said wing members, means for fixing said slide member at selected positions along said beam to vary the angular positions of said wing members relative to said beam, rake elements attached one to each of said wing members and having a plurality of forwardly extending tines, substantially in alignment with said horizontal bottom flange, a rake element supporting member for each rake element mounted on said rake element and extending along the under surface of said flanges, each rake element having a rear portion spaced from said supporting member and extending over the forward edge of one of said flanges, bracket means carried by each supporting element and extending rearwardly therefrom and then upwardly to lie along the rear surface of one of said wing members, and adjusting means carried by said upwardly extending portion for tightening against the rear surface of one of said wing members to hold the rake element against forward movement relative to the wing member on which it is mounted.

2. An implement for raking and the like comprising a vertical member having substantial frontal surface area and having a forwardly extending substantially horizontal bottom flange, a handle member attached to said vertical member, and a rake element attached to said vertical member and having a plurality of substantially forwardly extending tines substantially in alignment with said horizontal bottom flange, a rake element supporting member attached to said tines and extending along the under surface of said flange, said rake element having a rear portion spaced from said supporting member and extending over the forward edge of said flange, bracket means carried by said supporting element and extending rearwardly therefrom and then upwardly along the rear surface of said vertical member, and threaded means carried by said upwardly extending portion for tightening against the rear surface of said vertical member to hold the rake element against forward movement relative to the vertical member.

CHARLES MANN ROSE.

REFERENCES CITED

The following references are of record in the file of this patent:

UNITED STATES PATENTS

| Number | Name | Date |
|---|---|---|
| 308,751 | Conley | Dec. 2, 1884 |
| 359,255 | Hertzel | Mar. 15, 1887 |
| 425,695 | Pontious | Apr. 15, 1890 |
| 501,430 | Knight | July 11, 1893 |
| 556,389 | Wheeler | Mar. 17, 1896 |
| 629,917 | Olson et al. | Aug. 1, 1899 |
| 731,419 | Wykoff | June 16, 1903 |
| 954,521 | Kirby | Apr. 12, 1910 |
| 1,174,804 | Bell | Mar. 7, 1916 |
| 1,334,969 | Sagert | Mar. 30, 1920 |
| 1,506,634 | Hartshorn | Aug. 26, 1924 |
| 1,960,894 | Buehler | May 29, 1934 |
| 2,336,553 | Leunis | Dec. 14, 1943 |

FOREIGN PATENTS

| Number | Country | Date |
|---|---|---|
| 713,572 | France | Aug. 17, 1931 |